W. F. STAGGERS.
ANTISKID DEVICE FOR AUTO TIRES.
APPLICATION FILED DEC. 23, 1920.
1,384,358.
Patented July 12, 1921.
2 SHEETS—SHEET 1.
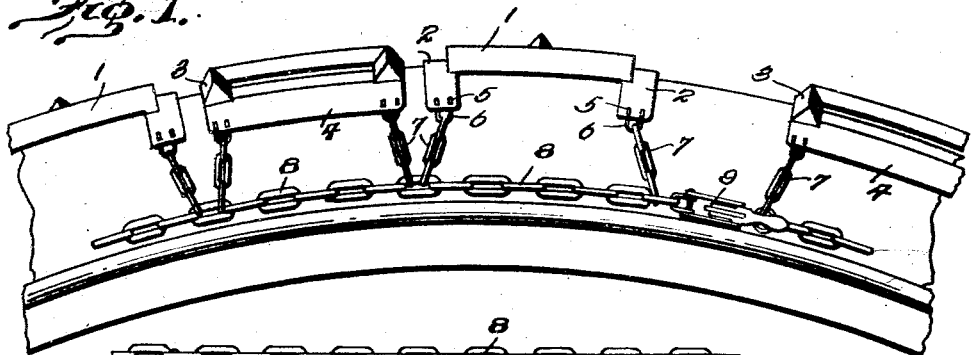
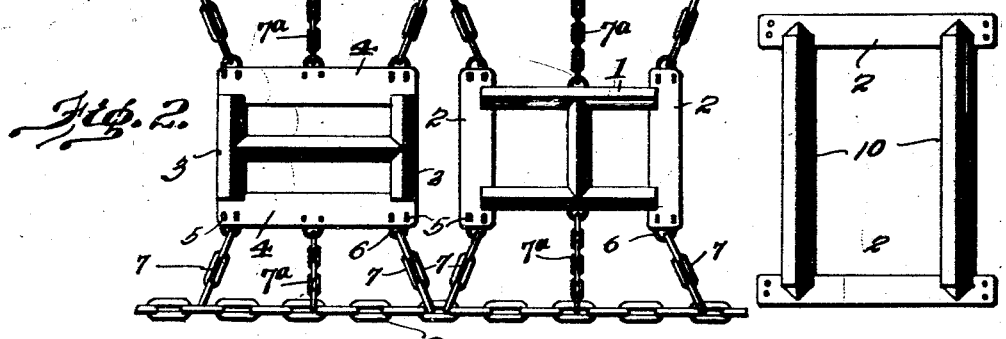
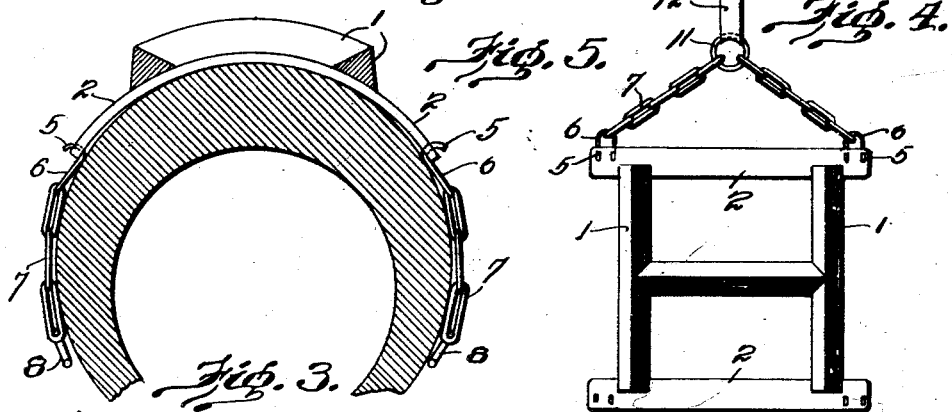
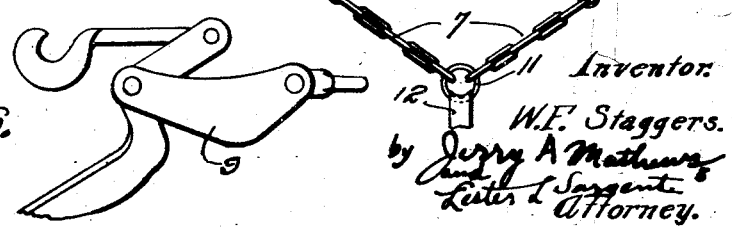

W. F. STAGGERS.
ANTISKID DEVICE FOR AUTO TIRES.
APPLICATION FILED DEC. 23, 1920.
1,384,358.
Patented July 12, 1921.
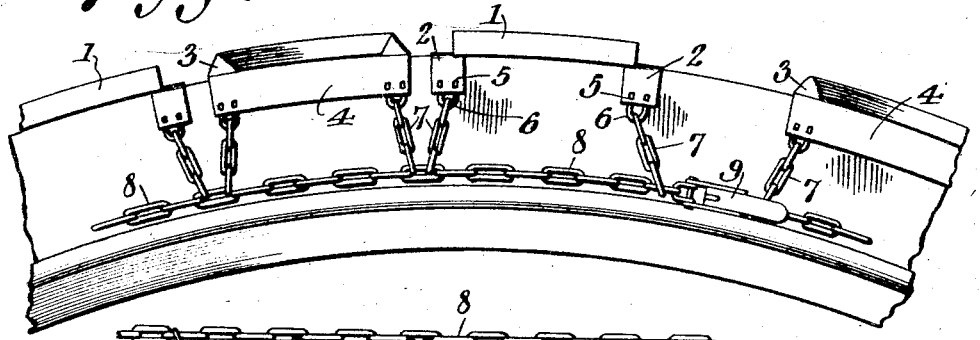
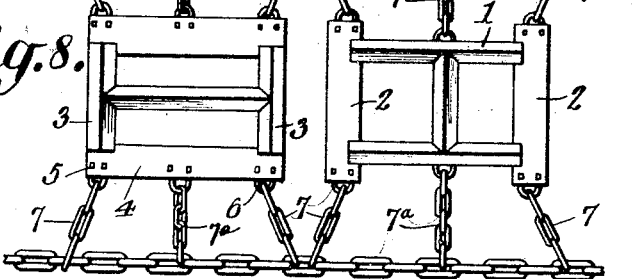
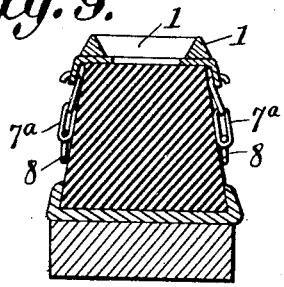
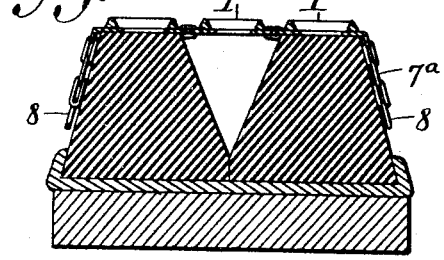
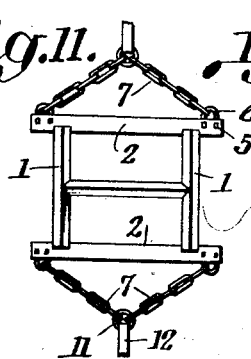
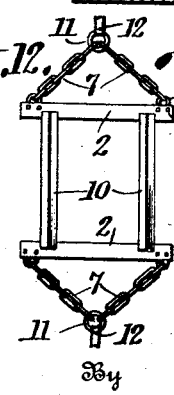
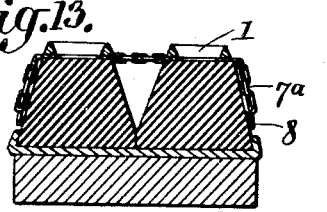
Inventor
W. F. Staggers

UNITED STATES PATENT OFFICE.

WILLIAM F. STAGGERS, OF MANNINGTON, WEST VIRGINIA.

ANTISKID DEVICE FOR AUTO-TIRES.

1,384,358.     Specification of Letters Patent.     Patented July 12, 1921.

Application filed December 23, 1920. Serial No. 432,669.

*To all whom it may concern:*

Be it known that I, WILLIAM F. STAGGERS, a citizen of the United States, residing at Mannington, in the county of Marion and State of West Virginia, have invented new and useful Antiskid Devices for Auto-Tires, of which the following is a specification.

The object of my invention is to provide improved anti-skid chains which can be manufactured at low cost and which will prolong the life of the tire as compared with other non-skid devices, and which will not cut the tire nor cause casings to break, nor cause blow-outs, inasmuch as my invention distributes the pressure equally over the smooth curved (or flat in the case of truck tire chains) bottom surface of the anti-skid members.

It is also my object to provide means for effectually, easily and quickly applying and tightening such a chain on the tire, and easily removing same.

It is furthermore an object of my invention to lessen the danger of accidents by providing anti-skid devices of a modified form for preventing skidding of the front wheels, when making short turns.

It is further an object of my invention to provide as a new article of manufacture an emergency non-skid device which can be readily applied and which consists of a single non-skid member of the type shown and similar to that employed in my anti-skid chains.

It is furthermore my object to provide novel H-shaped and I-shaped anti-skid elements, the portions of which, extending longitudinally of the tire, are adapted to prevent side slipping or skidding, and the transverse portions of which are adapted to prevent forward sliding, slipping or skidding of the tire when the brakes are suddenly applied.

It is also an important object of my invention to provide a form of the anti-skid chains adapted for application to motor truck tires, both of the single tire and of the dual tire type, and to provide the novel combination of chains shown for this purpose. These and other objects of my invention I attain by the mechanism illustrated in the accompanying drawings, in which—

Figure 1 is a side elevation of the antiskid chain applied to a portion of a tire;

Fig. 2 is a top plan of a modification of a portion of the chain;

Fig. 3 is a cross section through an automoble tire, showing my invention applied thereon;

Fig. 4 is a detail view of a modified form of non-skid member having the transverse traction element of the other forms omitted, that member not being necessary on front tires;

Fig. 5 is a plan view of my emergency traction member and its attaching means;

Fig. 6 is a side elevation of my chain tightening element;

Fig. 7 is a side elevation of a portion of the modified form of my invention used on motor truck tires;

Fig. 8 is a top plan of the modification of the invention for dual truck tires;

Fig. 9 is a transverse section of my invention mounted on a single tread truck tire;

Fig. 10 is a transverse section through the modification of the invention for dual truck tires;

Figs. 11 and 12 are similar forms to that shown in Fig. 5, but for motor truck tires; and Fig. 13 is a further modification for dual tires.

Like numerals designate like parts in each of the several views.

Referring to Figs. 1 to 3 in the accompanying drawings, I provide a plurality of H-shaped traction bars 1, all portions of which are preferably triangular in cross section, and which elements are mounted on and suitably secured to or made integral with suitable transversely curved flat relatively light strips 2. It is within the contemplation of my invention to make the strips 2 and 4 of any desirable width, whereby to prevent their damaging the tire in case of partial or complete deflation, and said strips are preferably flexible. I also provide a plurality of I-shaped traction bars 3, all portions of which are preferably triangular in cross section and which are mounted on or are formed integral with the relatively flat side strips 4 of any suitable width.

The transverse portions of members 1 and 3 are suitably shaped to conform to the shape of the tire to which they are applied, whether said tire be a flat motor truck tire or the usual pneumatic tire for automobiles, and flat strips 2 and 4 are similarly suitably shaped to conform to the tires to which the anti-skid chains are applied. The flat strips 2 and 4 are each provided with suitable openings 5, of which there may be one or more, which are releasably engaged by the hook ends of the U-shaped or other suitable hooks 6, preferably as shown, said members 6 being attached to connecting chains 7 and 7ª. Chains 7 are disposed in the diagonal arrangement shown and connected, preferably, to the same link of the side chains 8 whereby to more securely hold the anti-skid elements to prevent slipping.

For effectually securing my device on the tire, I provide at one end of each of the side chains 8, the novel toggle joint hooks 9, which have a much wider range of operation than the ordinary lever fastener, thus making it possible to secure the chains snugly on the tires and obviating the possibility of their working loose and striking the mud guards—a defect common with many prior ron-skid devices.

Referring to Fig. 4, I may provide a modified anti-skid device, consisting of the two longitudinally extending members 10 mounted on flat strips 2, and without any transversely disposed traction element. This device is intended for use on front wheels only where a transverse traction element is unnecessary.

Referring to Fig. 4 and Fig. 5, I may provide as a new article of manufacture, for use as an emergency traction device, the II-shaped and H-shaped anti-skid devices shown, having its traction elements triangular in cross section, and having the flat end strips 2 shaped to conform to the tire to which it is applied, said strips 2 being provided with suitable orifices 5 as shown and adapted to be engaged by suitable hooks 6 which in turn are attached to chains 7 which are connected to a ring 11 which in turn is attached to a suitable strap or chain 12 which can be fastened around the wheel in any suitable manner as by any suitable conventional buckle or fastener (not shown), or by my hook 9. The manner of applying the device will be apparent from the accompanying drawings illustrating its appearance when mounted on a tire.

The function of the longitudinal portion of the H-shaped member 1, and of the I-shaped member 3 is to prevent skidding or side slipping; and the function of the transverse portions of the aforesaid members is to prevent any forward skidding or sliding of the car when the brakes are applied, the purpose of the invention being to provide a safety-first or anti-skid chain that will prevent accidents under all conditions in which accidents are likely to occur. It is within the contemplation of my invention to suitably modify the shape or curvature of the anti-skid devices hereinafter claimed to make same conform to the shape or curvature of the various types of automobile, single tread and dual tread tires for trucks for which the device is primarily designed.

The I-shaped, double I-shaped, and H-shaped members being substantially equivalent elements, the expression "I-shaped" as used in the claim hereinafter set forth is to be construed as applying to, and the claim as including within its scope, all or any of the aforesaid elements as hereinbefore described and illustrated in the accompanying drawings.

What I claim is:

As a new article of manufacture, an anti-skid device consisting of I-shaped anti-skid bars, flat strips formed integrally on the ends of said I-shaped bars, opposite short chains hooked to the ends of said flat strips, rings to which said short chains are attached, and means secured to said rings for removably mounting the said anti-skid bars on and securing them over the tread of the tire.

WILLIAM F. STAGGERS.